United States Patent
Tazai

[19]

[11] Patent Number: 6,006,887
[45] Date of Patent: Dec. 28, 1999

[54] SHIFT LOCK MECHANISM OF COLUMN AUTOMATIC TRANSMISSION SHIFT LEVER DEVICE

[75] Inventor: Akira Tazai, Aichi-ken, Japan

[73] Assignee: Mannoh Kogyo Co., Ltd., Japan

[21] Appl. No.: 08/908,185

[22] Filed: Aug. 7, 1997

[30] Foreign Application Priority Data

| Aug. 9, 1996 | [JP] | Japan | ................................ 8-210896 |
| Aug. 9, 1996 | [JP] | Japan | ................................ 8-210897 |
| Jul. 7, 1997 | [JP] | Japan | ................................ 9-180874 |

[51] Int. Cl.$^6$ .................................................. B60K 41/26
[52] U.S. Cl. ....................... 192/220.2; 477/94; 477/96; 477/99; 70/247; 70/252; 74/473.23; 74/473.31
[58] Field of Search ............................... 192/220.2, 220, 192/218, 220.3, 220.4; 477/94, 96; 70/245, 247, 248, 249, 252; 74/473.23, 473.21

[56] References Cited

U.S. PATENT DOCUMENTS

| 4,934,209 | 6/1990 | Dewitt et al. ......................... 74/473 |
| 4,936,431 | 6/1990 | Shinpo .................................. 192/4 A |
| 5,022,504 | 6/1991 | Kobayashi ........................ 192/220.2 |
| 5,027,931 | 7/1991 | Ratke et al. ...................... 192/220.2 |
| 5,050,411 | 9/1991 | Kawachi et al. ..................... 70/248 |
| 5,511,641 | 4/1996 | Snell et al. ...................... 192/220.2 |
| 5,542,512 | 8/1996 | Maehara ........................... 192/220.2 |
| 5,588,514 | 12/1996 | Snell ............................... 192/220.2 |
| 5,647,465 | 7/1997 | Burkhard et al. ................ 192/220.4 |

FOREIGN PATENT DOCUMENTS

| 2-38330 | 3/1990 | Japan . |
| 5-86654 | 11/1993 | Japan . |

*Primary Examiner*—Charles A Marmor
*Assistant Examiner*—Ankur Parekh
*Attorney, Agent, or Firm*—Parkhurst & Wendel, L.L.P.

[57] ABSTRACT

In a shift lock mechanism of a column AT shift lever device, a select plate movable by operation of a select cable is pivotally connected to an end portion of a shaft that is turnable by a shift lever. A distal end of the select plate is engageable with a detent plate. A shift lock plate is provided on an outer surface of a retainer holding the shaft, in such a manner that the shift lock plate is slidable relative to the retainer. The shift lock plate cooperates with braking operation and key operation to restrict movement of the select plate, thereby performing a predetermined shift lock function.

16 Claims, 9 Drawing Sheets

SHIFT LOCK MECHANISM OF COLUMN AUTOMATIC TRANSMISSION SHIFT LEVER DEVICE

BACKGROUND OF THE INVENTION

The present invention relates to a shift lock mechanism of an automotive column automatic transmission (AT) shift lever device.

A column AT shift lever device is a device wherein a shift lever is mounted near a column shaft. In a widely employed construction, at the time of a shift operation, for example, from the parking position to a drive position, a select button provided in a shift knob is pressed so that the engagement between a detent plate and a detent member is released by operation of a select rod or a select cable, thereby permitting shift operations to proceed.

Column AT shift levers of this type incorporate a shift lock mechanism. The shift lock mechanism is a multipurpose safety device which prevents a car from jolting into motion by requiring the driver to step on the brake pedal before engaging the car into gear, other than the park position, and also prevents removal of the key unless the column shift is returned to the park position to prevent the car from rolling. The lock cylinder has a LOCK position when inserting/removing a key, and an ACC position to start and drive the car.

As a shift lock mechanism described above, a solenoid type mechanism has been conventionally employed, wherein movement of the brake pedal is detected by a switch, and when the brake pedal is depressed, a solenoid is operated to release the shift lock. However, such solenoid type shift lock mechanisms have drawbacks in that a solenoid adds to the total weight, and there is a need to provide a mechanical emergency override in case of a problem in the electrical system. Thus, the entire construction becomes complicated and costly.

SUMMARY OF THE INVENTION

It is, therefore, an object of the present invention to provide a shift lock mechanism that is more reliable than conventional shift lock mechanisms that use electrical components.

It is another object of the present invention to reduce the costs of manufacturing by using a less-complicated design than conventional shift lock mechanisms.

It is still another object of the present invention to utilize a shift lock that weighs less than conventional shift lock mechanisms.

The foregoing objects and others are provided by the present invention comprising a select plate movable by operation of a select cable. The select plate is pivotally connected to an end portion of a shaft that is rotatable by a shift lever, and a distal end of the select plate is engageable with a detent plate. A shift lock plate, that cooperates with at least one of braking operation and key operation to restrict movement of the select plate, is located on an outer surface of a retainer holding the shaft, in such a manner that the shift lock plate is slidable relative to the retainer.

According to another embodiment of the present invention, the shift lock plate may be slidably secured by two pins protruding from the outer surface of the retainer.

According to still another embodiment of the present invention, the shift lock plate may have a recess portion engageable with the distal end of the select plate so that when the recess portion is engaged with the distal end of the select plate, operation of the select plate is prevented.

According to another aspect of the present invention, there is provided a shift lock mechanism of a column AT shift lever device including a select plate movable by operation of a select cable. The select plate is pivotally connected to an end portion of a shaft that is turnable by a shift lever, a distal end of the select plate being engageable with a detent plate. A shift lock plate is provided for cooperating with braking operation and key operation to restrict movement of the select plate.

The shift lock mechanism may comprise a shift lock plate located on an outer surface of a retainer in such a manner that the shift lock plate is slidable relative to the retainer, and the retainer rotatably holds the shaft fixed to a base portion of the shift lever.

The shift lock mechanism may further include a control lever provided at an end of the shaft, the control lever being moved by operation of the shift lever to operate an automatic transmission through a shift cable.

The select plate may be pivotably connected to a pivot shaft provided on a flat plate-like portion formed at an end of the shaft.

The shift lock mechanism may further include a construction in which the select cable extends through an interior of the shift lever and is fixed to an end portion of the select plate so that when a select button provided in a knob connected to the shift lever is depressed, the select cable is pulled and the select plate is thereby moved.

According to still another aspect of the present invention, there is provided a shift lock mechanism of a column AT shift lever device including a select plate movable by operation of a select cable. A select plate is pivotally connected to an end portion of a shaft that is movable by a shift lever, and a distal end of the select plate is engageable with a detent plate. A shift lock plate that cooperates with braking operation and key operation to restrict movement of the select plate is located on an outer surface of a retainer holding the shaft, in such a manner that the shift lock plate is slidable relative to the retainer. The shift lock plate has an engaging hole engageable with a shift lock pin cooperable with a brake pedal so that when the brake pedal is not depressed while the column AT shift lever device is in the park position, the shift lock pin is engaged with the engaging hole and thereby prevents the shift lock plate from sliding. The shift lock plate additionally has an engaging portion engageable with a shift lock protrusion provided on a key cylinder so that when a key is turned to a predetermined LOCK position, the engaging portion of the shift lock plate becomes engaged with the shift lock protrusion and thereby prevents the shift lock plate from sliding.

The shift lock plate may be permitted to slide, provided that the brake pedal is pressed while the column AT shift lever device is in the park position and the key is turned to a position other than the predetermined LOCK position.

The shift lock mechanism may also have a construction wherein if the shift lever is not in a predetermined state when the key is about to be returned to the predetermined LOCK position, the engaging portion of the shift lock plate restricts movement of the shift lock protrusion of the key cylinder and thereby prevents the key from being returned to the predetermined LOCK position.

BRIEF DESCRIPTION OF THE DRAWINGS

The foregoing and further objects, features and advantages of the present invention will become apparent from the following description of a preferred embodiment with reference to the accompanying drawings, wherein like numerals are used to represent like elements and wherein.

DETAILED DESCRIPTION

A preferred embodiment of the present invention is described in detail hereinafter with reference to the drawings.

It should be understood that the drawings and accompanying description of the preferred embodiments of the present invention are described for a shift lever device for location on a steering wheel column-mounted shift on the left side of the column, as typically would be done in right-side driven vehicles for use in Japan or the United Kingdom, for example. It will be understood that for such mechanisms for left-side driven vehicles, as typically used in the United States, for example, the parts of the inventive shift lever devices would be mirror images of the devices as shown and described herein.

Figure 1:
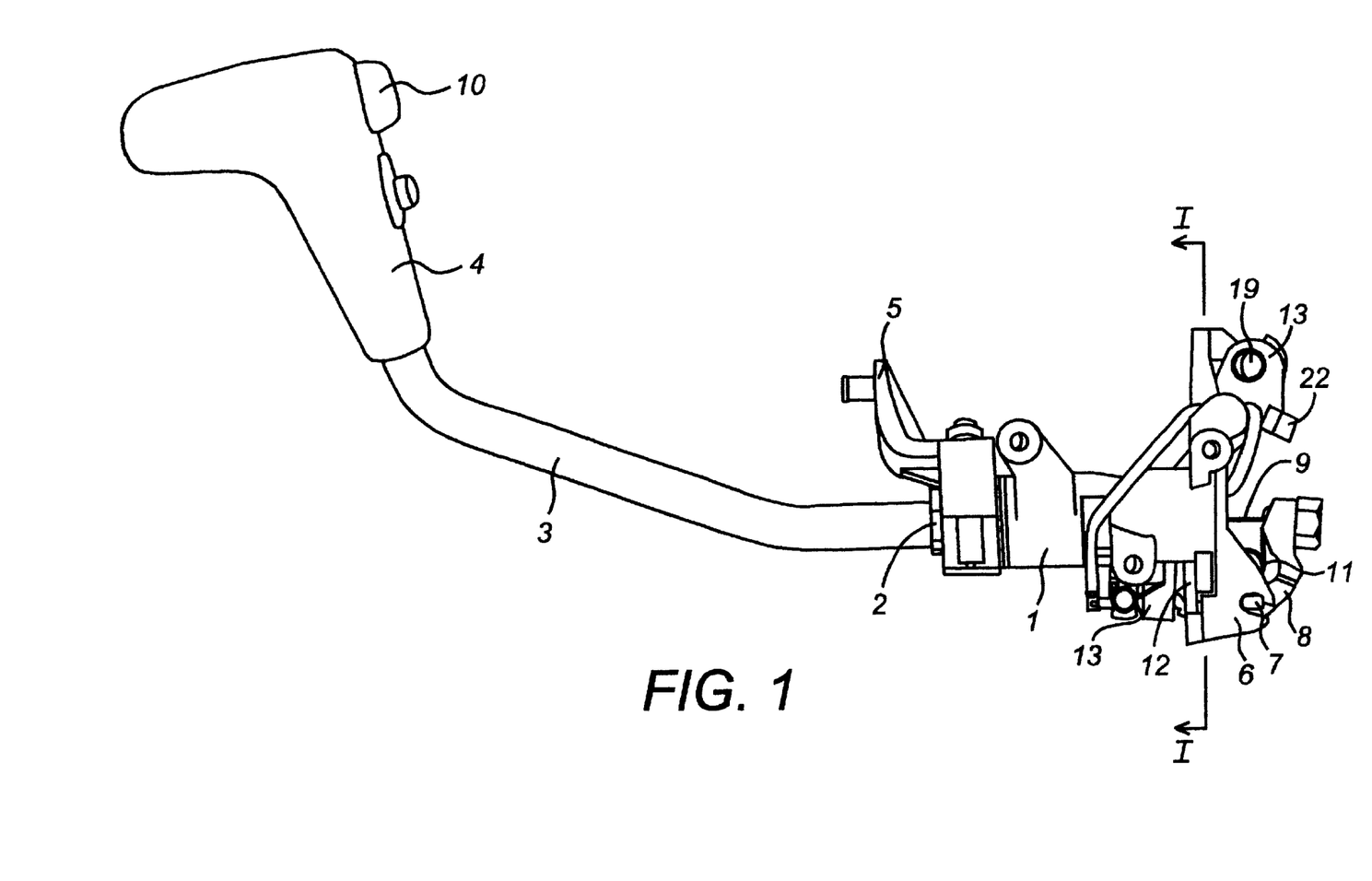
FIG. 1 is a top view of an entire column AT shift lever device incorporating a shift lock mechanism according to a preferred embodiment of the present invention.
Figure 2:
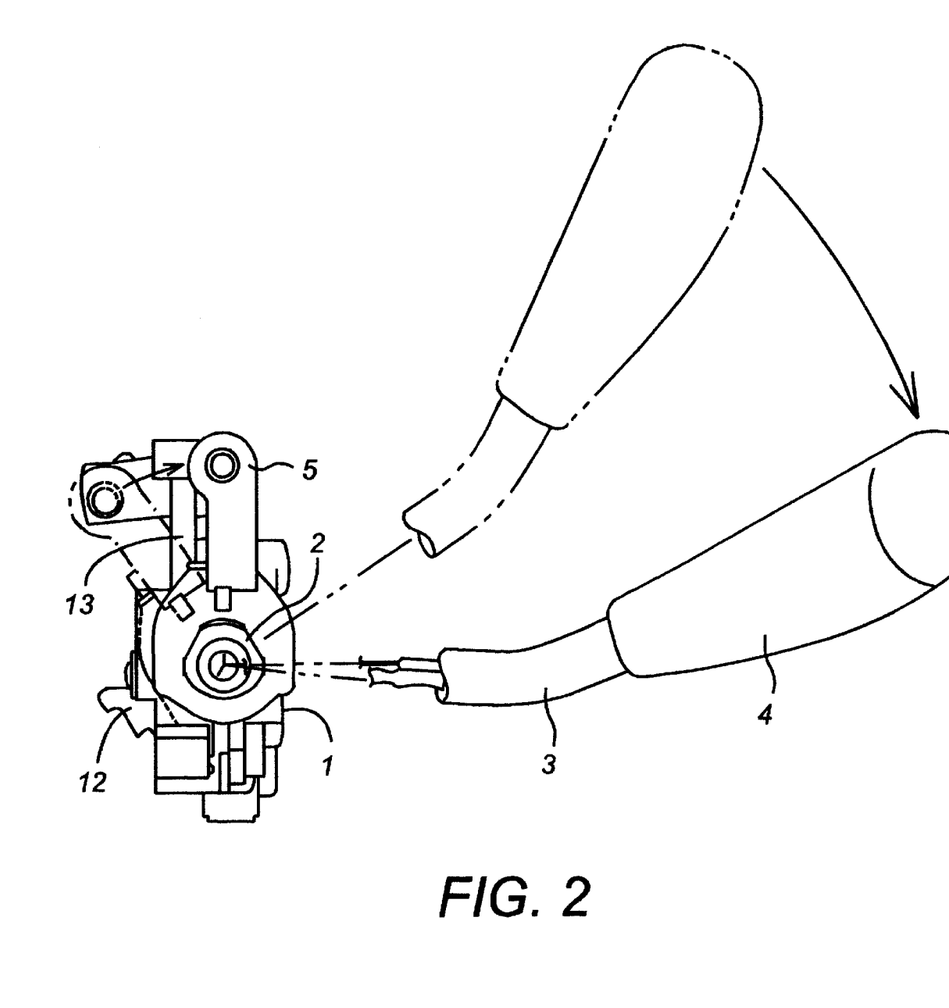
FIG. 2 is a left side view of the column AT shift lever device shown in FIG. 1.
Figure 3:
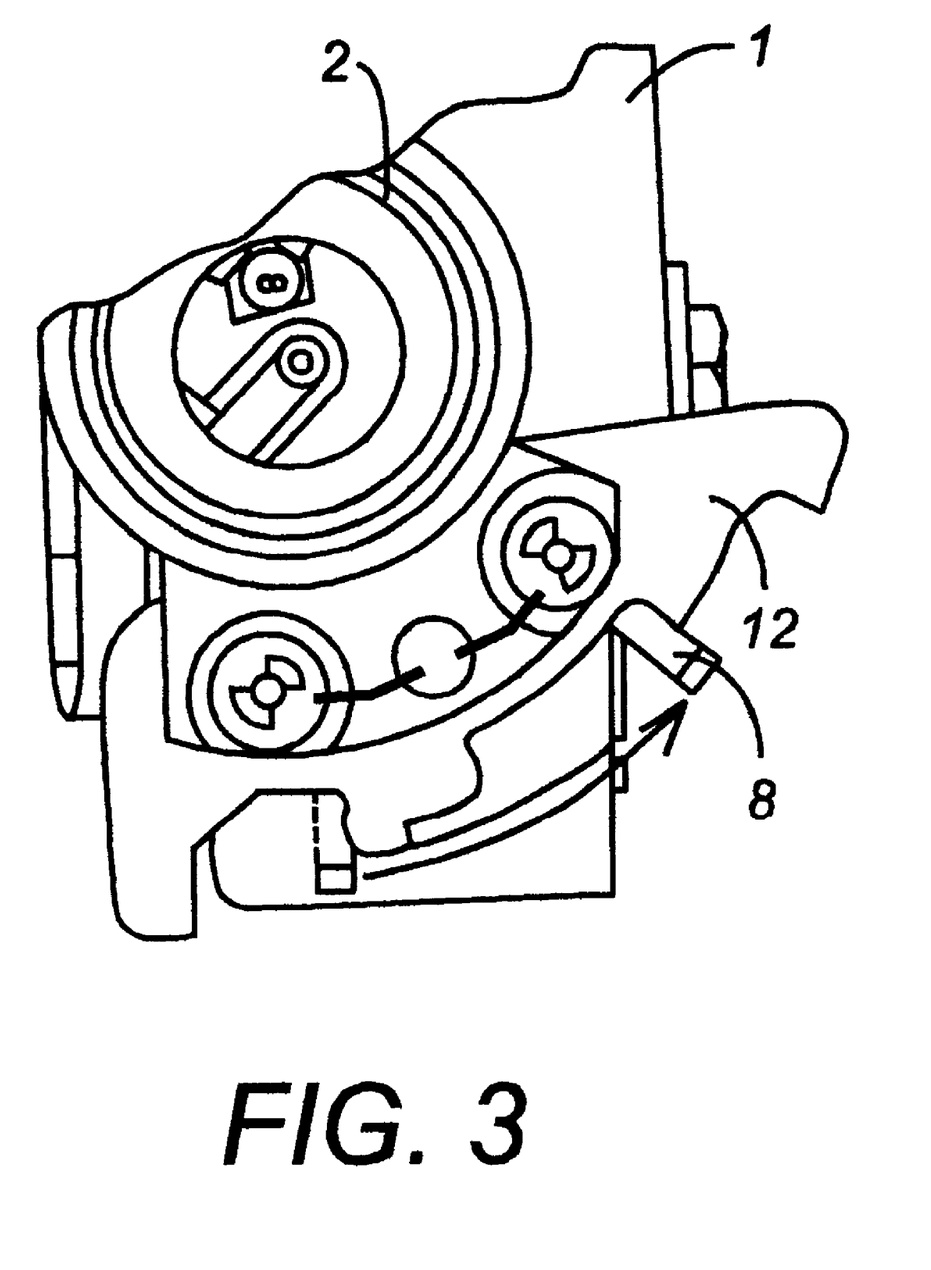
FIG. 3 is an enlarged, partial sectional view taken on plane I—I of FIG. 1.
Figure 4:
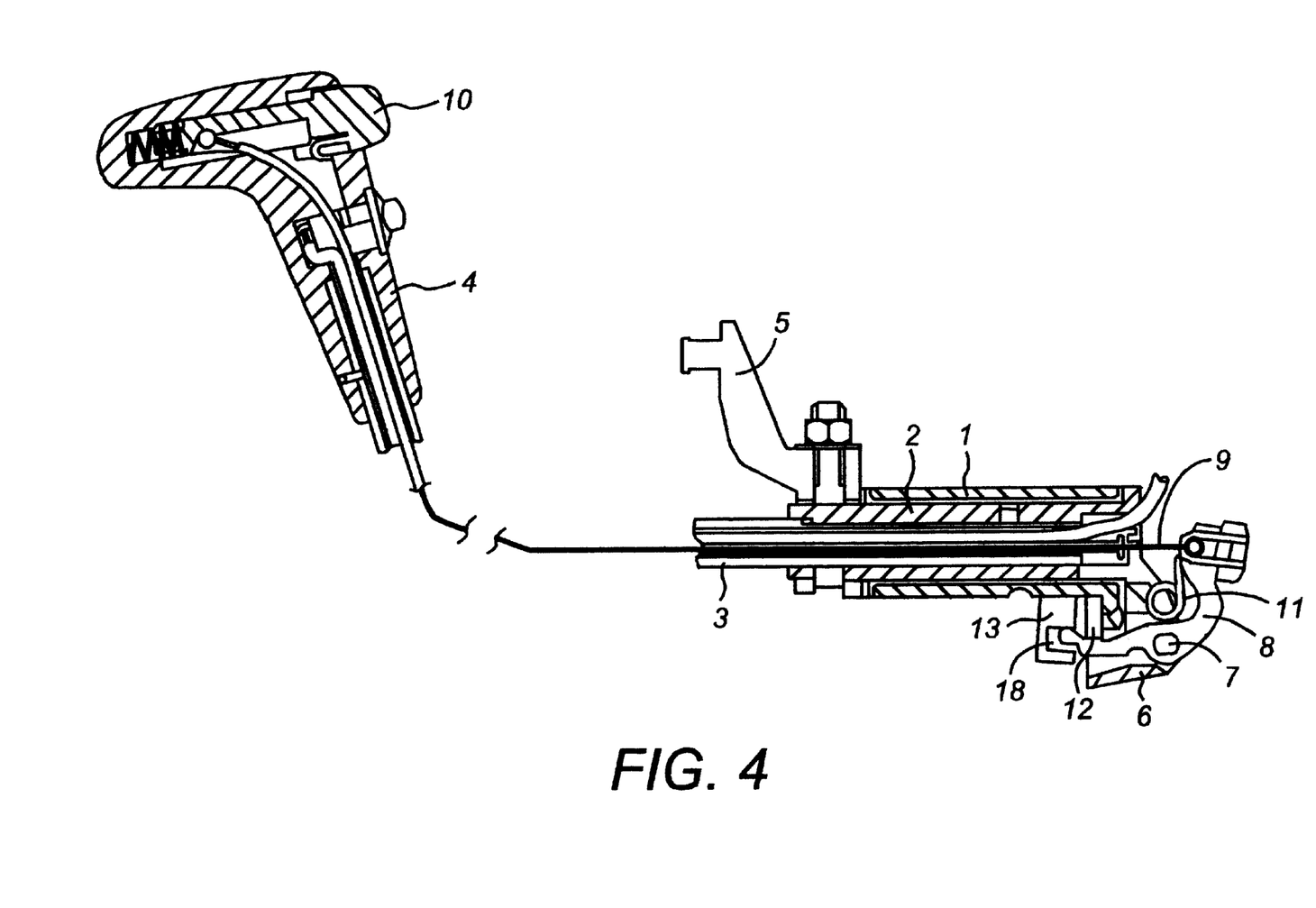
FIG. 4 is a sectional view of portions shown in FIG. 1.

FIG. 1 shows an elevation of an entire column AT shift lever device incorporating a shift lock mechanism according to a preferred embodiment, FIG. 2 is a left side view thereof, and FIG. 3 is an enlarged sectional view taken on plane I—I of FIG. 1. A hollow shaft 2 is rotatably supported inside a retainer 1. A hollow shift lever 3 has a knob 4. The hollow shaft 2 is fixed to a base portion of the shift lever 3, and can be turned by the shift lever 3. A control lever 5 is located on an end portion of the hollow shaft 2 as shown in FIG. 4. The control lever 5 swings as the shift lever 3 is operated as indicated in FIG. 2, thereby operating an automatic transmission through a shift cable (not shown).

Figure 5:
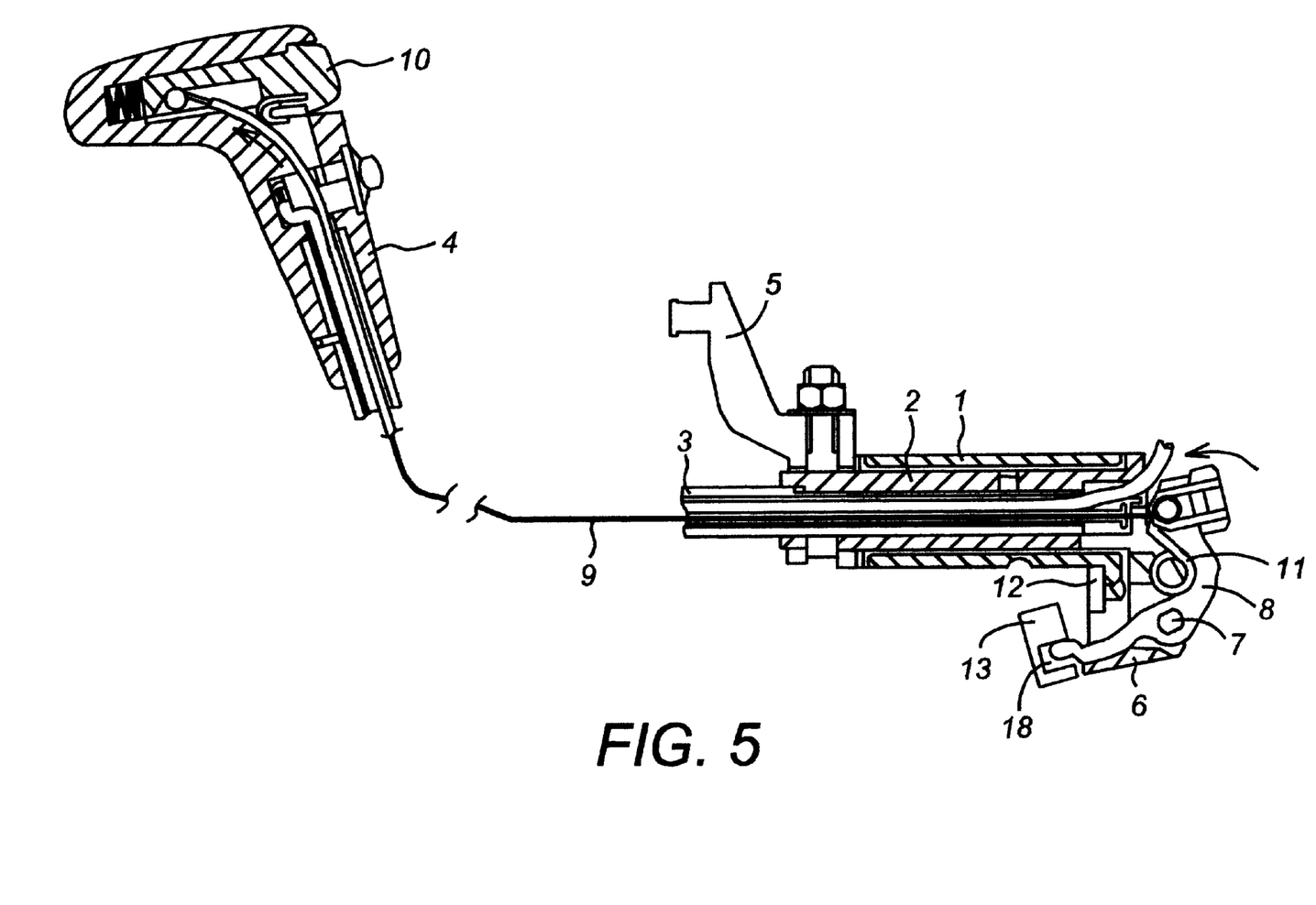
FIG. 5 is a sectional view of portions shown in FIG. 1.

The other end of the hollow shaft 2 is formed together with or firmly connected with a flat plate-like portion 6, as shown in FIGS. 1 and 4. A select plate 8 is pivotally connected to a pivot shaft 7 provided on the flat plate portion 6. Fixed to an end portion of the select plate 8 is a select cable 9 extending through an interior of the shift lever 3. When a select button 10 of the knob 4 is depressed to pull the select cable 9, the select plate 8 swings as indicated in FIG. 5. A main return spring 11 returns the select cable 9 and the select plate 8 to a position indicated in FIG. 4 when the select button 10 is released from the depression.

A generally flat detent plate 12 is engaged with a distal end of the select plate 8 by the force of the main return spring 11. The detent plate 12 has a projection-recess shape as shown in FIG. 3. To shift from the parking position to another position, it is necessary to move the distal end of the select plate 8 outwardly of the detent plate 12 by pulling the select cable 9 to move the select plate 8 as indicated in FIG. 5, as in a conventional mechanism.

Figure 6:
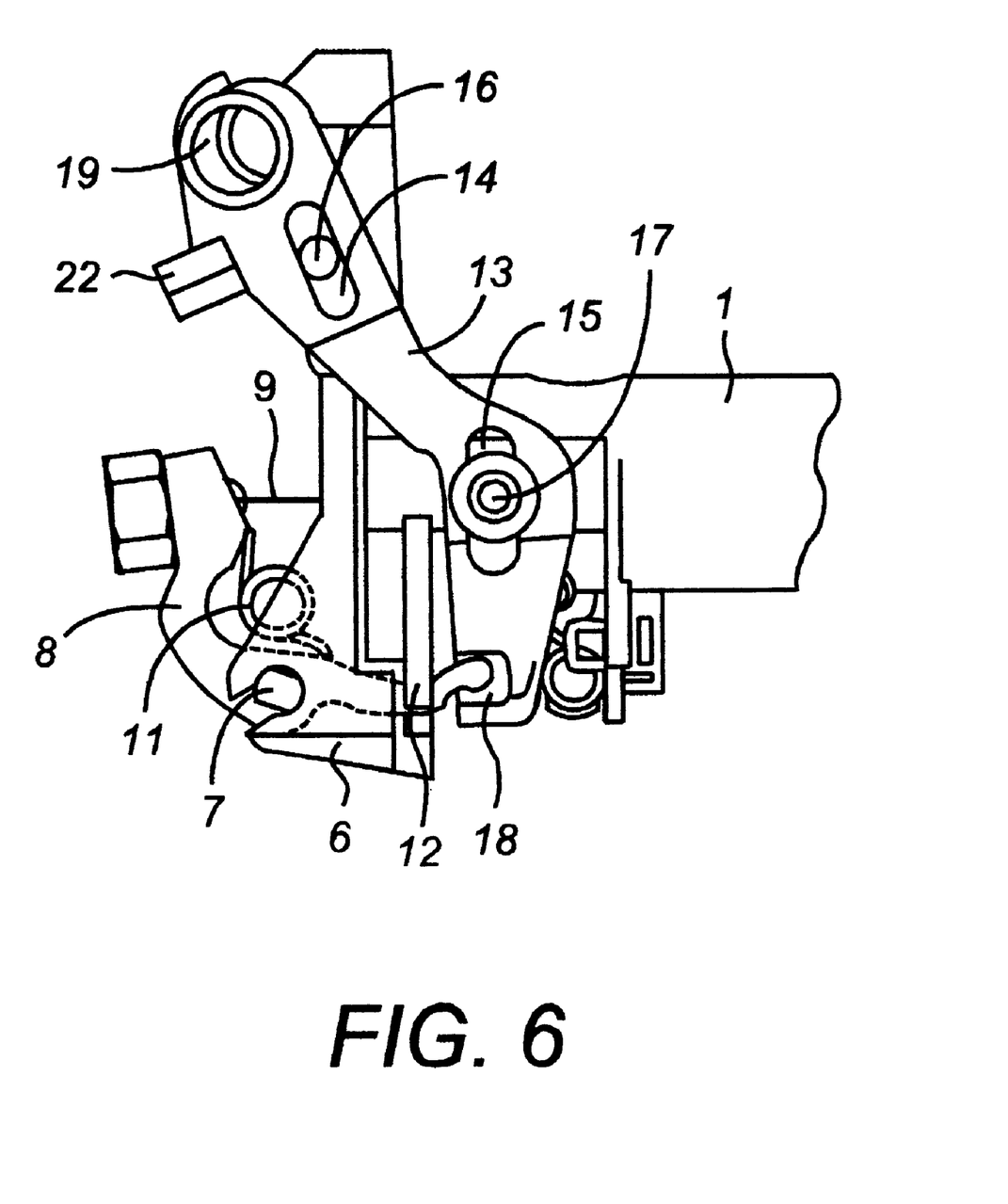
FIG. 6 is a rear view of portions shown in FIG. 1, illustrating the shift lock mechanism in a park position.

The shift lock mechanism according to this embodiment performs a shift lock function as described above by restricting movement of the select plate 8 in cooperation with braking operation and key operation. For this function, a shift lock plate 13 is provided on an outer surface of the retainer 1. The shift lock plate 13 has long holes 14, 15 as shown in FIG. 6. The shift lock plate 13 is supported by engagement between the long holes 14, 15 and two pins 16, 17 provided on the outer surface of the retainer 1, in such a manner that the shift lock plate 13 is slidable between the position indicated in FIG. 6 and the position indicated in FIG. 7, relative to the retainer 1.

Figure 7:
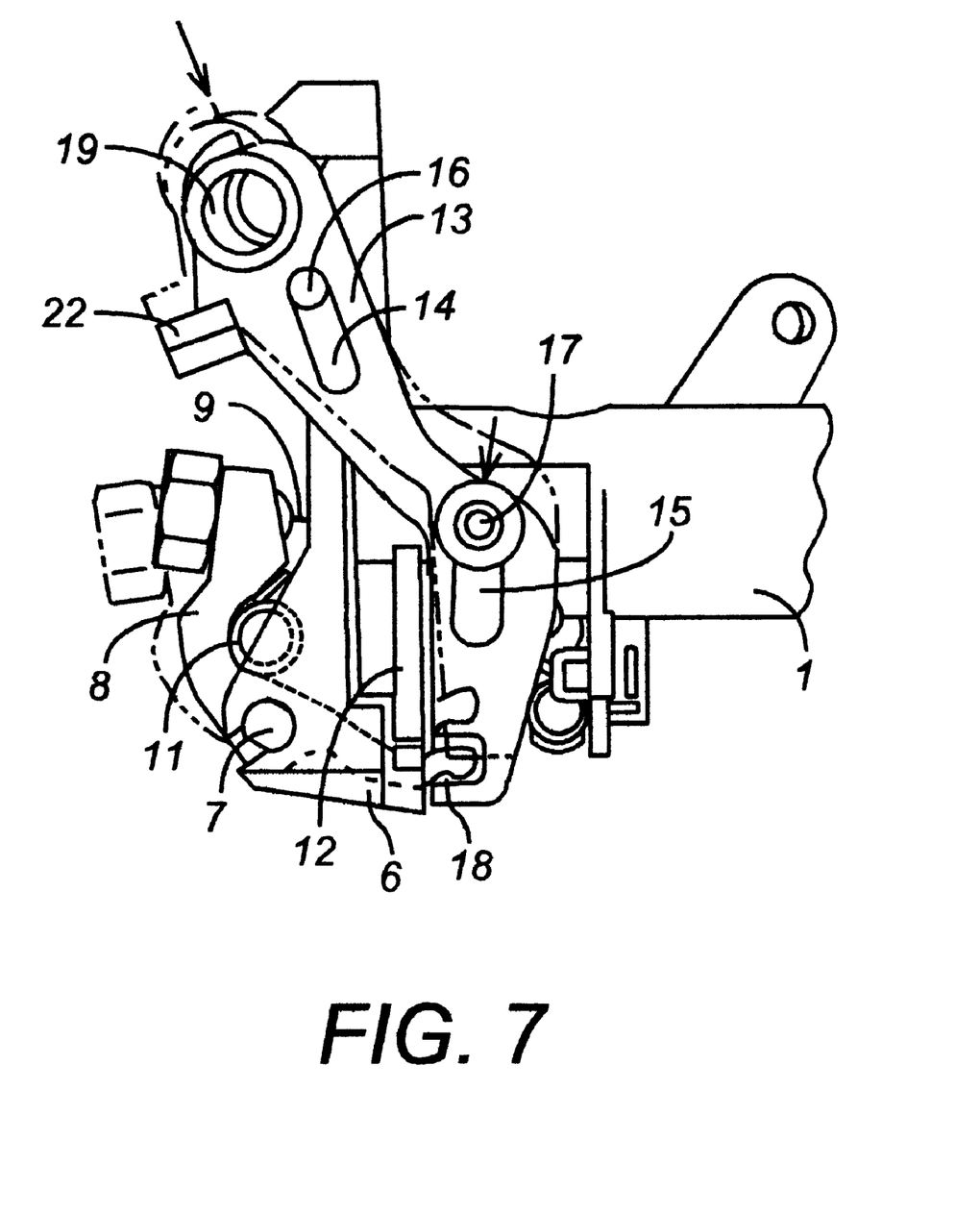
FIG. 7 is a rear view of portions shown in FIG. 1, illustrating the shift lock mechanism in a driving position.

The shift lock plate 13 has, near one of its ends, a stop portion 18 that stops with the distal end of the select plate 8, as shown in FIGS. 6 and 7. Therefore, the select plate 8 is operable when the shift lock plate 13 is in a freely (slidable state, and the select plate 8 becomes inoperable when the shift lock plate 13 is locked.

Figure 8:
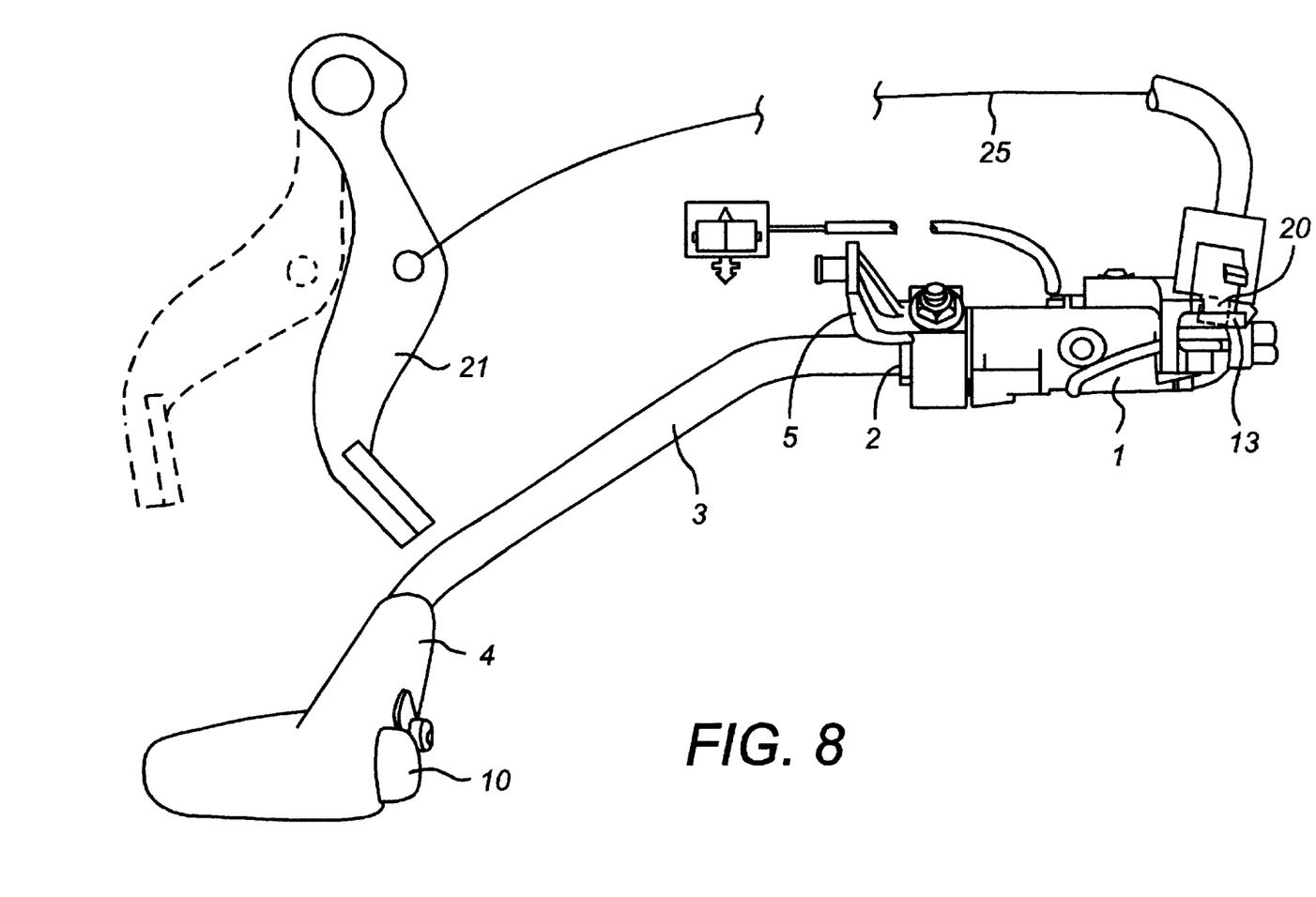
FIG. 8 illustrates the relationship between a brake pedal and the shift lock mechanism.

The shift lock plate 13 further has, near the other end thereof, an engaging hole 19 corresponding to a shift lock pin 20 that cooperates with a brake pedal 21, as shown in FIG. 8. The shift lock pin 20 is drawn out of the engaging hole 19 of the shift lock plate 13 by operation of a shift lock cable 25 when the brake pedal 21 is depressed as indicated in FIG. 8. When the shift lever device is in the park position and the brake pedal 21 is not depressed, the shift lock pin 20 is engaged with the engaging hole 19 of the shift lock plate 13, penetrating a hole provided in the retainer 1, as shown in FIG. 8. In this state, the shift lock plate 13 is locked relative to the retainer 1.

Figure 9:
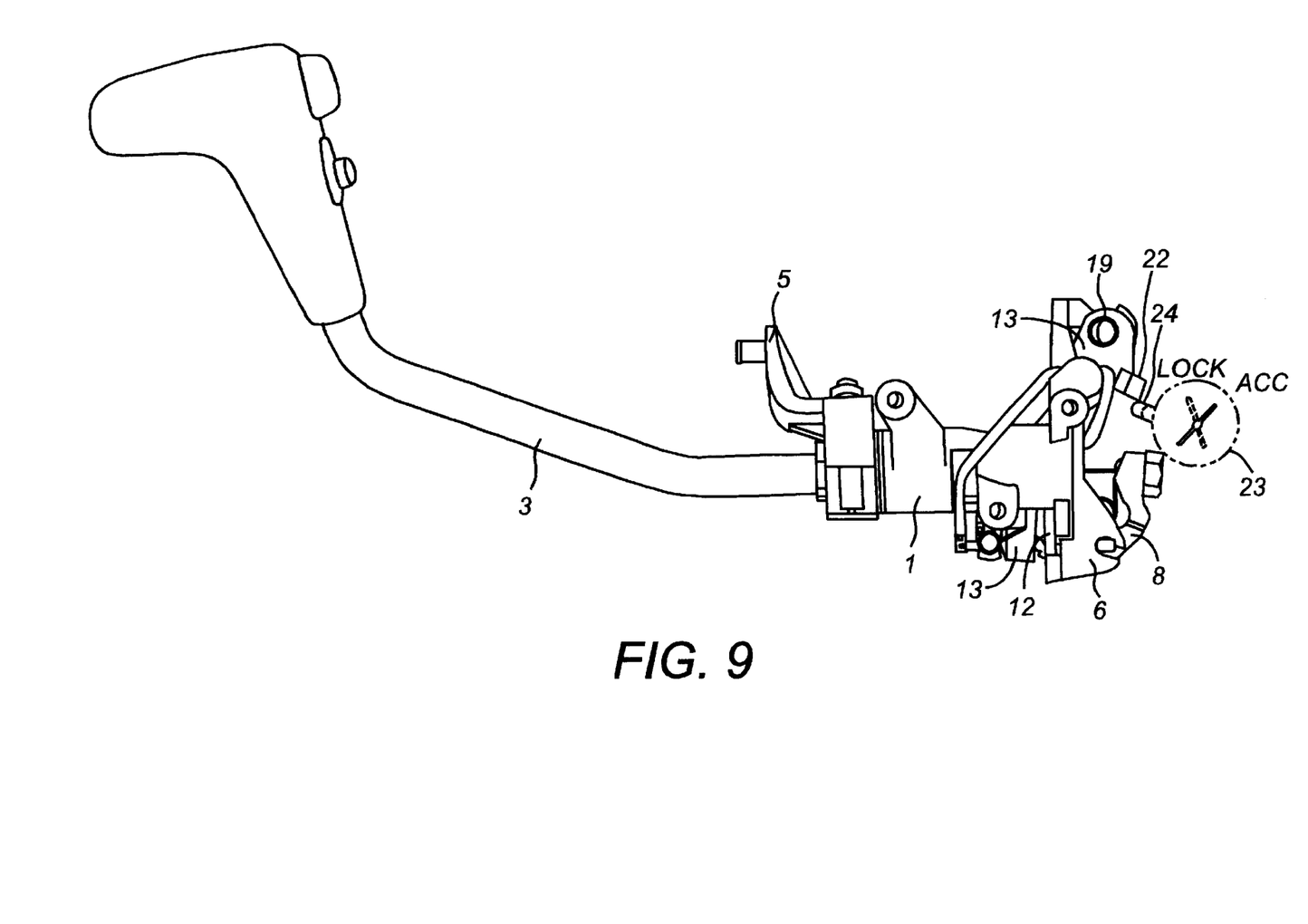
FIG. 9 illustrates the relationship between a key cylinder and the mechanism.

The shift lock plate 13 further has an engaging portion 22 projected near the engaging hole 19. The engaging portion 22 engages with a shift lock protrusion 24 of a key cylinder 23 as shown in FIG. 9. More specifically, when the key is turned to the LOCK position, the shift lock protrusion 24 protrudes to a position indicated by a solid line in FIG. 9 and engages with the engaging portion 22 of the shift lock plate 13, thereby locking the shift lock plate 13. When the key is turned to the ACC position, the shift lock protrusion 24 of the key cylinder 23 is withdrawn as indicated by a broken line in FIG. 9 so that the shift lock plate 13 is free to operate. Furthermore, when the shift lock plate 13 is moved downward from the plane of the drawing sheet as indicated in FIG. 7, the key is prevented from being returned to the LOCK position since the shift lock protrusion 24 of the key cylinder 23 hits the engaging portion 22 of the shift lock plate 13.

The operation of the shift lock mechanism according to the present invention will next be described.

In the park position, the engaging portion 22 of the shift lock plate 13 is engaged with the shift lock protrusion 24 of the key cylinder 23 as shown in FIG. 9, and the shift lock pin 20 is engaged with the engaging hole 19 of the shift lock plate 13, so that the shift lock plate 13 cannot be moved. As a result, the end portion of the select plate 8 remains fixed in the position indicated in FIGS. 4 and 6 by the stop portion 18 of the shift lock plate 13, so that the shift lever 3 cannot be shifted from the park position to any other position.

When it is desired to start the motor vehicle, the key is first turned from the LOCK position to the ACC position to withdraw the shift lock protrusion 24 of the key cylinder 23, thereby releasing it from the engagement with the engaging portion 22 of the shift lock plate 13. When the brake pedal 21 is subsequently depressed, the shift lock pin 20 is pulled out of the engaging hole 19 of the shift lock plate 13. As a result, the shift lock plate 13 becomes free. When the select button 10 of the knob 4 is subsequently depressed to pull the select cable 9, the select plate 8 swings and pushes the shift lock plate 13 downward, thereby releasing the select plate 8 from engagement with the detent plate 12, and it becomes possible to shift the shift lever 3 freely to any other position.

When the shift lever 3 is at a position other than the park position, the shift lock plate 13 assumes a relatively lower position as indicated in FIG. 7, so that the engaging hole 19 of the shift lock plate 13 assumes a position deviated relative to the hole of the retainer and the shift lock pin 20. Therefore, the shift lock pin 20 will not enter the engaging hole 19 of the shift lock plate 13 during driving even if the brake pedal 21 is released. For parking, the key can be turned to the LOCK position only after the shift lever 3 is returned to the park position to raise the shift lock plate 13 to a position indicated in FIG. 6. Otherwise, the key cannot be turned to the LOCK position because the engaging portion 22 of the shift lock plate 13 prevents the shift lock protrusion 24 of the key cylinder 23 from advancing.

As understood from the above description, the present invention is able mechanically to perform a shift lock further without requiring a solenoid, thereby allowing weight reduction. Furthermore, since it is not necessary separately to provide a mechanical override mechanism, the invention further provides advantages in that the construction can be simplified and the production cost can be reduced.

While the present invention has been described with reference to what is presently considered to be a preferred embodiment thereof, it is to be understood that the invention is not limited to the disclosed embodiment or constructions. To the contrary, the invention is intended to cover various modifications and equivalent arrangements included within the spirit and scope of the appended claims.

What is claimed is:

1. A shift lock mechanism of a column automatic transmission shift lever device, comprising:
    a select plate movable by operation of a select cable, the select plate being pivotally connected to an end portion of a hollow shaft that is rotatable by a shift lever, a distal end of the select plate being engageable with a detent plate; and
    a shift lock plate for cooperating with at least one of braking operation and key operation to restrict movement of the select plate, the shift lock plate being located on an outer surface of a retainer holding the hollow shaft so that the shift lock plate is slidable relative to the retainer.

2. A shift lock mechanism of a column automatic transmission shift lever device according to claim 1, wherein the shift lock plate is slidably secured by two pins protruding from the outer surface of the retainer.

3. A shift lock mechanism of a column automatic transmission shift lever device according to claim 1, wherein the shift lock plate comprises a stop portion engageable with the distal end of the select plate so that the stop portion prevents movement of the select plate when movement of the shift plate is prevented.

4. A shift lock mechanism of a column automatic transmission shift lever device according to claim 1, wherein the shift lock plate comprises an engaging hole formed near an end of the shift lock plate, the engaging hole being engageable with a shift lock pin cooperable with a brake pedal so that when the brake pedal is not depressed while the column AT shift lever device is in the park position, the shift lock pin is engaged with the engaging hole and thereby prevents the shift lock plate from sliding.

5. A shift lock mechanism of a column automatic transmission shift lever device according to claim 1, wherein the shift lock plate comprises an engaging portion engageable with a shift lock protrusion provided on a key cylinder so that when a key is turned to a predetermined LOCK position, the engaging portion of the shift lock plate becomes engaged with the shift lock protrusion and thereby prevents the shift lock plate from sliding.

6. A shift lock mechanism of a column automatic transmission shift lever device according to claim 5, wherein the engaging portion of the shift lock plate restricts when the shift lever is not in a predetermined state when the key is about to be returned to the predetermined LOCK position movement of the shift lock protrusion of the key cylinder and thereby prevents the key cylinder from being returned to the predetermined LOCK position.

7. A shift lock mechanism of a column automatic transmission shift lever device comprising:
    a select plate movable by operation of a select cable, the select plate being pivotally connected to an end portion of a shaft that is rotatable by a shift lever, a distal end of the select plate being engageable with a detent plate; and
    a shift lock plate for cooperating with braking operation and key operation to restrict movement of the select plate;
    wherein the shift lock plate is located on an outer surface of a retainer so that the shift lock plate is slidable relative to the retainer, the retainer holding the shaft rotatably, the shaft being fixed to a base portion of the shift lever.

8. A shift lock mechanism of a column automatic transmission shift lever device according to claim 7, further comprising a control lever provided at an end of the shaft, the control lever being movable by operation of the shift lever to operate an automatic transmission through a shift cable.

9. A shift lock mechanism of a column automatic transmission shift lever device according to claim 7, wherein the select plate is pivotally connected to a pivot shaft provided in a flat plate-like portion formed at an end of the shaft.

10. A shift lock mechanism of a column automatic transmission shift lever device according to claim 9, wherein the select cable extends through an interior of the shift lever and is fixed to an end portion of the select plate so that when a select button provided in a knob connected to the shift lever is pressed, the select cable is pulled and the select plate is thereby moved.

11. A shift lock mechanism of a column automatic transmission shift lever device according to claim 7, wherein the shift lock plate comprises an engaging hole formed near an end of the shift lock plate, the engaging hole being engageable with a shift lock pin cooperable with a brake pedal so that when the brake pedal is not depressed while the column AT shift lever device is in the park position, the shift lock pin is engaged with the engaging hole and thereby prevents the shift lock plate from sliding, and wherein the shift lock plate further comprises an engaging portion engageable with a shift lock protrusion provided on a key cylinder so that when the key cylinder is turned to a predetermined LOCK position, the engaging portion of the shift lock plate becomes engaged with the shift lock protrusion and thereby prevents the shift lock plate from sliding.

12. A shift lock mechanism of a column automatic transmission shift lever device according to claim 11, wherein the shift lock plate is allowed to slide, provided that the brake pedal is pressed while the column AT shift lever device is in the park position and that the key cylinder is turned to a position other than the predetermined LOCK position.

13. A shift lock mechanism of a column automatic transmission shift lever device according to claim 12, wherein the engaging portion of the shift lock plate restricts movement of the shift lock protrusion of the key cylinder when the shift lever is not in a predetermined state when the key is about to be returned to the predetermined LOCK position and thereby prevents the key cylinder from being returned to the predetermined LOCK position.

14. A shift lock mechanism of a column automatic transmission shift lever device comprising:

a select plate movable by operation of a select cable, the select plate being pivotally connected to an end portion of a shaft that is rotatable by a shift lever, a distal end of the select plate being engageable with a detent plate; and a shift lock plate for cooperating with braking operation and key operation to restrict movement of the select plate, the shift lock plate being provided on an outer surface of a retainer holding the shaft, so that the shift lock plate is slidable relative to the retainer, the shift lock plate having:

an engaging hole engageable with a shift lock pin cooperable with a brake pedal so that when the brake pedal is not pressed while the column automatic transmission shift lever device is in the park position, the shift lock pin is engaged with the engaging hole and thereby prevents the shift lock plate from sliding; and an engaging portion engageable with a shift lock protrusion provided on a key cylinder so that when a key is turned to a predetermined LOCK position, the engaging portion of the shift lock plate becomes engaged with the shift lock protrusion and thereby prevents the shift lock plate from sliding.

15. A shift lock mechanism of a column automatic transmission shift lever device according to claim 14, wherein the shift lock plate is allowed to slide, provided that the brake pedal is depressed while the column automatic transmission shift lever device is in the park position and that the key cylinder is turned to a position other than the predetermined LOCK position.

16. A shift lock mechanism of a column automatic transmission shift lever device according to claim 15, wherein the engaging portion of the shift lock plate restricts movement of the shift lock protrusion of the key cylinder when the shift lever is not in a predetermined state when the key is about to be returned to the predetermined LOCK position and thereby prevents the key from being returned to the predetermined LOCK position.

* * * * *